United States Patent
Ater et al.

(10) Patent No.: US 6,687,224 B1
(45) Date of Patent: Feb. 3, 2004

(54) BANDWIDTH SHARING METHOD

(75) Inventors: Dan Ater, Kfar Warburg (IL); Meir Deutsch, Tel Aviv (IL); Shmuel Iliaich, Bat-Yam (IL)

(73) Assignee: Orckit Communications, Ltd., Tel Aviv (IL)

(*) Notice: Subject to any disclaimer, the term of this patent is extended or adjusted under 35 U.S.C. 154(b) by 0 days.

(21) Appl. No.: 09/514,745

(22) Filed: Feb. 28, 2000

(51) Int. Cl.⁷ .............................................. H04L 12/26

(52) U.S. Cl. ..................... 370/230; 370/420; 709/229

(58) Field of Search ............................... 370/229, 230, 370/232, 233, 234, 235, 236, 236.1, 236.2, 235.1, 395.2, 395.21, 395.4, 395.41, 401, 420; 709/229, 233, 235

(56) References Cited

U.S. PATENT DOCUMENTS

| | | | |
|---|---|---|---|
| 5,258,979 A | * 11/1993 | Oomuro et al. | 370/232 |
| 5,313,454 A | * 5/1994 | Bustini et al. | 370/231 |
| 5,317,563 A | * 5/1994 | Oouchi et al. | 370/232 |
| 5,446,733 A | * 8/1995 | Tsuruoka | 370/232 |
| 5,491,801 A | * 2/1996 | Jain et al. | 709/241 |
| 5,675,742 A | * 10/1997 | Jain et al. | 709/226 |
| 5,889,956 A | * 3/1999 | Hauser et al. | 709/226 |
| 5,982,776 A | * 11/1999 | Manning et al. | 370/414 |
| 5,996,013 A | * 11/1999 | Delp et al. | 709/226 |
| 6,046,980 A | * 4/2000 | Packer | 370/230 |
| 6,134,218 A | * 10/2000 | Holden | 370/232 |

OTHER PUBLICATIONS

Cheng Bandwidth allocation in a channelised ATM network. Teletraffic Symposium, 8th. IEE Eighth UK , Apr. 10–12, 1991, Page(s): 4/1–4/7.*

* cited by examiner

Primary Examiner—Hassan Kizou
Assistant Examiner—Dmitry Levitan
(74) Attorney, Agent, or Firm—Roberts Abokhair & Mardula, LLC

(57) ABSTRACT

A bandwidth sharing method for use on respective interstitial connections between on one side a plurality of users and on the other side a common data-link having a shared packet switching device, the method including performing the steps of:

monitoring data-link directed bandwidth from each user;
maintaining a current sum of the monitored bandwidth; and
whenever the current sum exceeds a predetermined data-link bandwidth threshold, reducing current collective data-link directed bandwidth by
  for substantially each user, comparing the respective user's data-link directed bandwidth with a predetermined data-link bandwidth threshold for the respective user;
  using an allocation function, selecting at least one user who is exceeding his predetermined data-link bandwidth threshold, and
  for a predetermined time interval, cutting the connection between each selected at least one user and the shared switching device, so as to restore a current sum of the monitored bandwidth to be not greater than the predetermined data-link bandwidth threshold.

14 Claims, 12 Drawing Sheets

Figure 4

40 Program Storage Device

41 Monitor User Bandwidth

42 Maintain Sum

43 Reduce Collective Bandwidth

44 Compare User Bandwidth

45 Select Exceeding User

46 Cut User Connection

Figure 5

```
Start:
For Port = 0 to K_Ports
If 0 ≤ Port ≤ 9
{
        If Frame-in-transit_Port
        {
                B = B
        }
        ELSE
        {
                If B > 0
                {
                        B = B – 1
                }
        }
}
ELSE
{
        If Frame-in-transit_Port
        {
                B = B + 1
        }
}
END If B > WMH
{
        For Port = 0 to K_Ports
        Tx-Flag_Ports = 0
}

If B < WML
{
        For Port = 0 to K_Ports
        Tx-Flag_Ports = 1
        END-IF
}
Go To Start
```

Figure 6

```
Start:
For i = 0 to n_out
If B > 0
{
        B = B - b_out
}
END
For Port = 0 to K_Ports
If Frame-in-transit_Port
{
        B = B + b_in
}

If B > WMH
{
        For Port = 0 to K_Ports
        Tx-Flag_Ports = 0
}

If B < WML
{
        For Port = 0 to K_Ports
        Tx-Flag_Ports = 1
}

Go To Start
```

Figure 7

```
Start:
For i = 0 to n_out
If B > 0
{
        B = B - b_out
}
END

For Port = 0 to K_Ports
If Frame-in-transit_Port
{
        B = B + b_in
}
END

If B > WMH
{
        For Port = 0 to K_Ports
        If PPL(Port) = 128
        {
                Tx-Flag_Ports = 0
        }
}

If B < WML
{
        For Port = 0 to K_Ports
        Tx-Flag_Ports = 1
}

Go To Start
```

Figure 8

```
Start:
For i = 0 to n_out
If B > 0
{
        B = B − b_out
}
END

For Port = 0 to K_Ports
If Frame-in-transit_Port
{
        B = B + b_in
        N_Port = N_Port + δ_Port
}
ELSE
{
        If N_Port > 0
        {
                N_Port = N_Port − 1
        }
}
END If B > WMH
{
        For Port = 0 to K_Ports
        If [δ_Port = 128 OR N_Port > 0]
        {
                Tx-Flag_Ports = 0
        }
        ELSE
        {
                Tx-Flag_Ports = 1
        }
}

If B < WML
{
        For Port = 0 to K_Ports
        Tx-Flag_Ports = 1
}

Go To Start
```

```
Start:
For i = 0 to n_out
If B > 0
{
        B = B - b_out
}
END

For Port = 0 to K_Ports
If Frame-in-transit_Port
{
        B = B + b_in
        N_Port = N_Port + δ_Port
}
ELSE
{
        If N_Port > 0
        {
                N_Port = N_Port - 1
        }

If [(Level0 AND N_Port > 0) OR (B > WMH)]
        {
                Tx-Flag_Port = 0
        }
        If [Level0 AND (N_Port = 0) AND (B < WML)]
        {
                Tx-Flag_Port = 1
        }

If [Level1 AND (B > WMH)]
        {
                Tx-Flag_Port = 0
        }
        If [Level1 AND (B < WML)
        {
                Tx-Flag_Port = 1
        }

If [Level2 AND N_Port > 0]
        {
                Tx-Flag_Port = 0
        }
        If [Level2 AND N_Port = 0]
        {
                Tx-Flag_Port = 1
        }

If [Level3 AND N_Port > 0 AND B > WMH]
        {
                Tx-Flag_Port = 0
        }
        If [Level3 AND ((N_Port = 0) OR (B < WML))]
        {
                Tx-Flag_Port = 1
        }
}
END
Go To Start
```

Figure 9

BANDWIDTH SHARING METHOD

FIELD OF THE INVENTION

The present invention generally relates to bandwidth sharing.

More specifically, the present invention relates to preventing a plurality of users from collectively exceeding a common data-link device bandwidth use threshold.

BACKGROUND OF THE INVENTION

Users of data-communications generally do not maintain a constant level of bandwidth traffic. More specifically, bandwidth use for most users is characterized by excessively sporadic or burst-like traffic. Since bandwidth is a valuable economic resource, any technology that increases bandwidth utilization without adversely effecting a quality of service (usually contracted for by the user with his service provider) delivers a worthwhile improvement.

Numerous systems have been developed for accomplishing improved bandwidth utilization. Many of these systems may be combined to provide further improvements. For example, time domain multiplexing and compression are mutually applicable in many data-communications modalities (e.g. telephone (POTS), directional and Omni-directional wireless transmission, Internet, etc.). Likewise, many systems have been developed to provide a common cooperative utilization of the scarce expensive bandwidth resource for a physical or circumstantial aggregation of users.

The following patents are thought to be useful for understanding the history of the art, the current state of the art, and the present needs and failings of the art. While it is presumed that the man of the art is already familiar with the substance conveyed by these items, others may find, in these items, concepts and descriptions that will advantageously supplement their appreciation of the present invention. Therefore, the citations given may be considered as uniquely disclosing salient aspects of the prior art.

It should be appreciated that the following patents collectively portray an outstanding need in the art, in that all of them rely on monitoring complex bandwidth metrics and on convoluting these metrics using some peculiar evaluation and decision function. Accordingly, there remains a need in the art for a method that accomplishes bandwidth sharing using simple metrics and using a straightforward evaluation and decision function.

U.S. Pat. No. 5,359,593 relates to Dynamic bandwidth estimation and adaptation for packet communications networks—Access control for a packet communications network includes a dynamic bandwidth updating mechanism that continuously monitors the mean bit rate of the signal source and the loss probability of the connection. These values are filtered to remove noise and then used to test whether the values fall within a pre-defined acceptable adaptation region in the mean bit rate, loss probability plane. Values falling outside of this region trigger bandwidth updating procedures which, in turn, result in acquiring a new connection bandwidth, and determining new filter parameters and new parameters for a leaky bucket access mechanism.

U.S. Pat. No. 5,274,625 relates to Traffic measurements in packet communications networks—A packet communications network relies on a few simple parameters to characterize the wide variety of traffic offered to that network, such as peak bit rate, mean bit rate and average packet burst length. A better representation of many types of traffic relies on an equivalent burst length, which produces the same loss probability distribution, but assumes that the distribution is un-correlated and exponential. Access control and bandwidth management based on such an equivalent burst length produces improved decisions due to the more accurate representation of the actual traffic distribution.

U.S. Pat. No. 5,313,458 relates to Traffic control system—To suppress the amount of data frames passing through a public network and to provide advantages for both the telephone company and subscribers, a traffic control system is provided for controlling traffic in data frames transmitted between a public network and a subscriber through channels. Each data frame consists of a header and a payload. The header includes a predetermined bit indicating whether or not the payload includes traffic data. The system comprises, between the public network and the subscriber, a traffic control unit that includes channel filters each for receiving data frames from the subscriber through the corresponding channel, and for transmitting each data frame to the public network only when the predetermined bit in the header of the data frame indicates that the payload includes traffic data, and a channel reproducing unit for receiving data frames from the public network, and for reproducing an omitted data frame that has been discarded, to transmit the received data frames and the reproduced data frame to the subscriber.

U.S. Pat. No. 5,412,647 relates to Rate enforcement for frame relay networks—A Frame Relay network must implement a rate (bandwidth) enforcement function at the access in the network so that service subscription violation by some users will not cause performance or throughput degradation of other users' service. A novel rate enforcement technique is disclosed. The new technique makes use of a "leaky bucket" algorithm in which a portion of one "leaky bucket" is set aside for high priority frames only.

NOTICES

The reader should appreciate that, on the one hand, it is appropriate to properly cite sufficient general and specific references to knowledge and appliance in the public domain. Therefore, care has heretofore been taken to present and document this knowledge in a through and comprehensive manner.

The reader should appreciate that, on the other hand, an invention, per se, generally represents a small but significant advance over appliance already known in the public domain. Therefore, unless otherwise specified in subsequent written correspondence with those authorities responsible for examining this document, the references heretofore presented and discussed constitute the inventors' actual and honest view of the closest prior art to the present invention.

The reader should also appreciate that any existing commercial product, which circumstantially derives from granted or pending patents, should be considered as the present best enabling mode of the technology disclosed in those patents.

Furthermore, the present invention will forthwith be described with a certain degree of particularity, however those versed in the art will readily appreciate that various modifications and alterations may be carried out without departing from either the spirit or scope, as hereinafter claimed.

SUMMARY OF THE INVENTION

The present invention relates to a bandwidth sharing method for use on respective interstitial connections between on one side a plurality of users and on the other side a common data-link having a shared packet switching device, the method including performing the steps of:

monitoring data-link directed bandwidth from each user;

maintaining a current sum of the monitored bandwidth; and whenever the current sum exceeds a predetermined data-link bandwidth threshold, reducing current collective data-link directed bandwidth by for substantially each user, comparing the respective user's data-link directed bandwidth with a predetermined data-link bandwidth threshold for the respective user;

using an allocation function, selecting at least one user who is exceeding his predetermined data-link bandwidth threshold, and for a predetermined time interval, cutting the connection between each selected at least one user and the shared switching device, so as to restore a current sum of the monitored bandwidth to be not greater than the predetermined data-link bandwidth threshold.

Accordingly, it should be appreciated that the present invention relates to a method that accomplishes bandwidth sharing using simple metrics and using a straightforward evaluation and decision function. More specifically, the simple metric is the actual current bandwidth in use by each user, the straightforward evaluation is adding up the metrics and comparing them to a maximum bandwidth value, and the straightforward decision function is IF to the total bandwidth use is greater than the maximum acceptable value THEN temporally cutting off at least one of the user's bandwidth capable connections.

Ostensibly, especially in packet switching data-communications, the sender and the receiver maintain sufficient buffered message packets to recover from intermittent transitory data-communication service cuts. When these service cuts become more severe, according to any system including the present invention, it is time for the user to consider increasing his bandwidth infrastructure services capability or to consider switching to more expensive peak load on-demand bandwidth resources purchasing.

BRIEF DESCRIPTION OF THE FIGURES

In order to understand the invention and to see how it may be carried out in practice, embodiments including the preferred embodiment will now be described, by way of non-limiting example only, with reference to the accompanying drawings, in which:

FIG. 4 illustrates a schematic view of a program storage device;

FIG. 5 illustrates the basic Bandwidth Control algorithm;

FIG. 6 illustrates the BC algorithm, suitable to Up-Links from as low as 1.55 Mbit/Sec and as fast as 155.52 Mbit/Sec;

FIG. 7 illustrates the BC algorithm with the added capability to commit to an attachment of a whole 10 Mbit/Sec chunk of bandwidth (BW);

FIG. 8 illustrates the BC algorithm with the addition of the variables $\delta_{Port}$ and $N_{Port}$;

FIG. 9 illustrates the BC algorithm with the addition of flags Level0, Level1, Level2, and Level3;

DETAILED DESCRIPTION OF THE INVENTION

Figure 1:
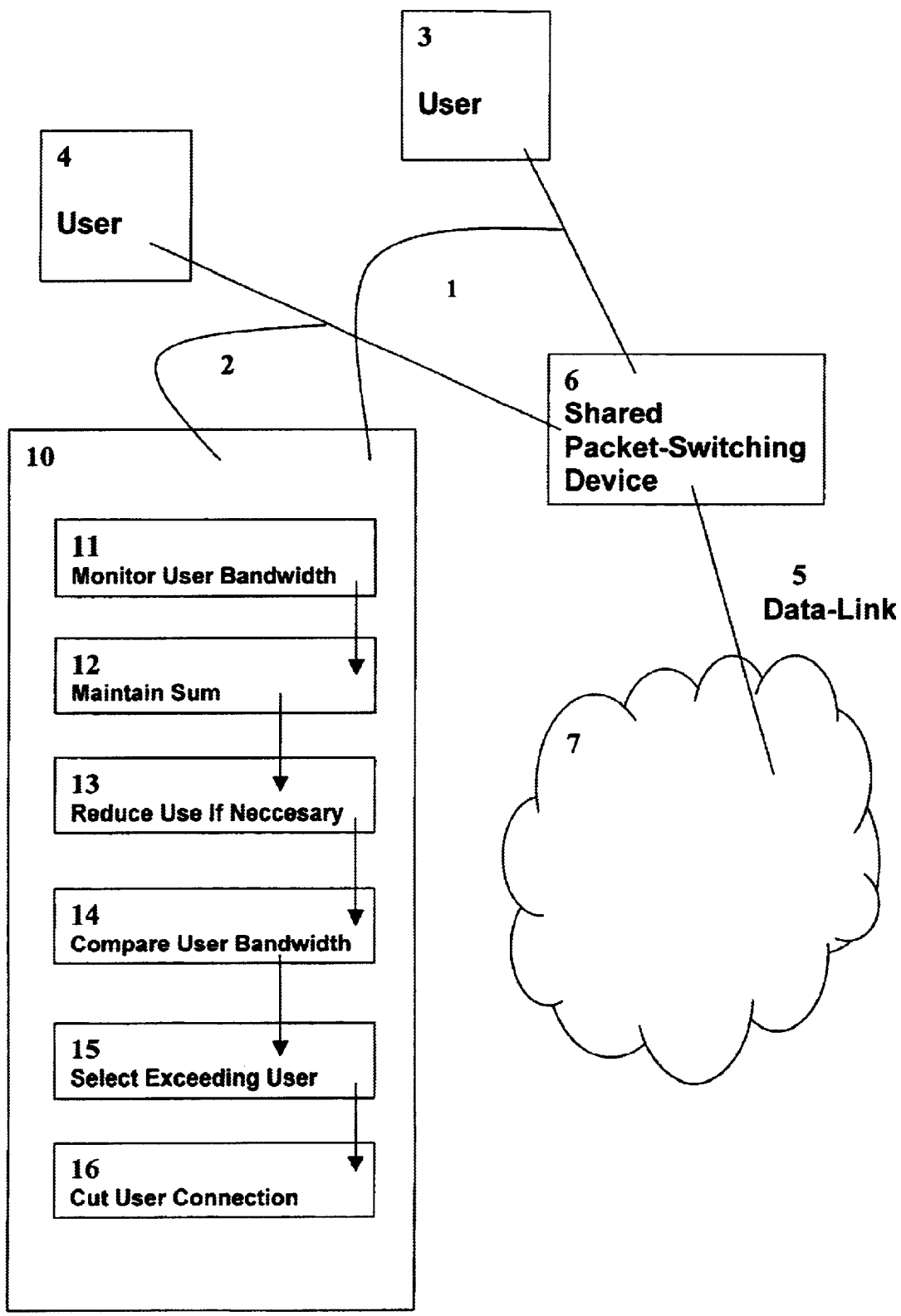
FIG. 1 illustrates a schematic view of a bandwidth sharing method.

The present invention relates to a bandwidth sharing method (illustrated in FIG. 1) for use on respective interstitial connections 12 between on one side a plurality of users 34 and on the other side a common data-link 5 (to a data-communications topology 7 using at least one compatible protocol; e.g. the Internet, LAN, WAN, intra-net, etc.) having a shared packet switching device 6. The instant method 10 includes performing the steps of:

monitoring 11 data-link directed bandwidth from each user (According to one embodiment the monitoring is of all the bandwidth used by each user, even the bandwidth which is directed to another user via the shared packet switching device; and not intended to use any bandwidth on the common data-link. According to another embodiment the monitoring is only of the data-link directed bandwidth used by each user. Monitoring with a differentiation between destinations requires a much higher degree of data examination and recognition than monitoring of all bandwidth.);

maintaining 12 a current sum of the monitored bandwidth; and whenever the current sum exceeds a predetermined data-link bandwidth threshold, reducing 13 current collective data-link directed bandwidth by for substantially each user, comparing 14 the respective user's data-link directed bandwidth with a predetermined data-link bandwidth threshold for the respective user;

using an allocation function, selecting 15 at least one user who is exceeding his predetermined data-link bandwidth threshold, and for a predetermined time interval, cutting 16 the connection between each selected at least one user and the shared switching device, so as to restore a current sum of the monitored bandwidth to be not greater than the predetermined data-link bandwidth threshold.

According to the preferred embodiment of the present invention, performing at least one of the steps is done above a predetermined frequency. For example, the step of monitoring is done by sampling each respective user with the common packet switching device every 10 milliseconds, or the step of maintaining is done (updated) every 10 milliseconds, or the step of reducing is done every 5 milliseconds, etc.

According to an embodiment of the present invention, the sub-steps of comparing and selecting are performed substantially with the same frequency as the monitoring step, so that the prerequisites to the sub-step cutting are always available in an updated form. Since all of the steps and sub-steps of the instant method may be performed asynchronously, it is preferred that the legitimacy of performing any cutting be maximized; and that occurrences where the cutting is (after the fact) irrelevant to preventing exceeding common data-link bandwidth allotment are minimized. (Substantially equivalent embodiments of the method of the present invention may be installed directly in an external computer-like device such as 10, or functions accomplished by the steps of the present method may be divided between cooperating front ends of 3 and 4 with back ends of 6 and 7, or a combination of external computer-like device with front ends or with back ends, or the total combination of all.)

Accordingly, in using the preferred embodiment of the present invention, the sub-steps of comparing and selecting are performed substantially with about the same predetermined frequency as the monitoring steps so that the prerequisites to the sub-step cutting are always available in a real-time form. This provides that the legitimacy of performing any cutting be maximized, when the predetermined frequency elected is adequate to evaluate smallest packets transmitted over the connections.

According to one embodiment of the present invention, the allocation function used in the selecting sub-step includes randomizing selection from among the plurality of users currently exceeding their respective predetermined data-link bandwidth threshold. According to another embodiment of the present invention, the allocation function used in the selecting sub-step includes a proportional weighting to each respective user's recent exceeding of his respective predetermined data-link bandwidth threshold.

According to an embodiment of the present invention, monitoring of data-link directed bandwidth includes measuring the respective bandwidth in units of actual bandwidth use which are substantially the same units as are used to determine if the predetermined data-link bandwidth threshold is exceeded. Accordingly if the bandwidth allotment for use of the common data-link is measured in kilobytes per second then each user connection need only be substantially monitored in units of kilobytes per second.

According to a further embodiment of the present invention, monitoring of data-link directed bandwidth includes measuring the respective bandwidth in predetermined time interval units of bits, bytes or multiples thereof. According to another embodiment of the present invention, monitoring of data-link directed bandwidth includes measuring the respective bandwidth in units of average or typical data-link directed packets.

According to an embodiment of the present invention, selecting includes ignoring at least one user who has just begun sending a large data-link directed packet. This feature tries to minimize "stress" on the retransmission buffering facilities of the users. An alternative embodiment of the present invention relates to cutting the connection as including checking that the connection is presently not being used for sending a data-link directed data transmission. This is a more rigorous version than the embodiment that only considers the transmission of large data-link directed packets.

According to an embodiment of the present invention, reducing includes updating the predetermined data-link bandwidth threshold with a new data-link bandwidth threshold. This feature is provided to accommodate global bandwidth allotment conditions on the data-communications media (e.g. the Internet) to which the common data-link is further connected to.

Figure 2:
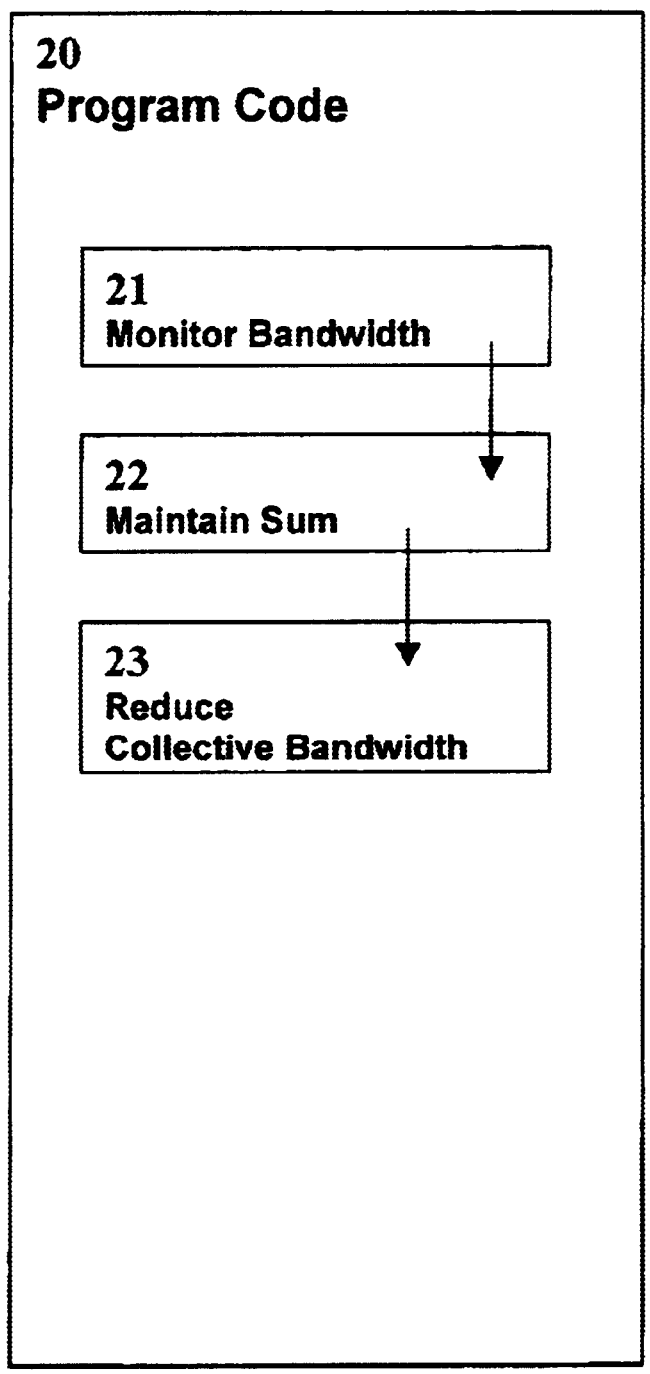
FIG. 2 illustrates a schematic view of part of an article of manufacture.

The present invention furthermore relates to an embodiment as an article of manufacture (illustrated in FIG. 2) including a computer usable medium having computer readable program code embodied therein for bandwidth sharing, for use on respective interstitial connections between on one side a plurality of users and on the other side a common data-link having a shared packet switching device, the computer readable program code in said article of manufacture 20 including:

first computer readable program code 21 for causing a computer to monitor data-link directed bandwidth from each user;

tied to the first computer readable program code, second computer readable program code 22 for causing the computer to maintain a current sum of the monitored bandwidth; and tied to the second computer readable program code, third computer readable program code 23 for causing the computer to, whenever the current sum exceeds a predetermined data-link bandwidth threshold, reduce current collective data-link directed bandwidth by:

for substantially each user, comparing the respective user's data-link directed bandwidth with a predetermined data-link bandwidth threshold for the respective user;

using an allocation function, selecting at least one user who is exceeding his predetermined data-link bandwidth threshold, and for a predetermined time interval, cutting the connection between each selected at least one user and the shared switching device, so as to restore a current sum of the monitored bandwidth to be not greater than the predetermined data-link bandwidth threshold.

Figure 3:
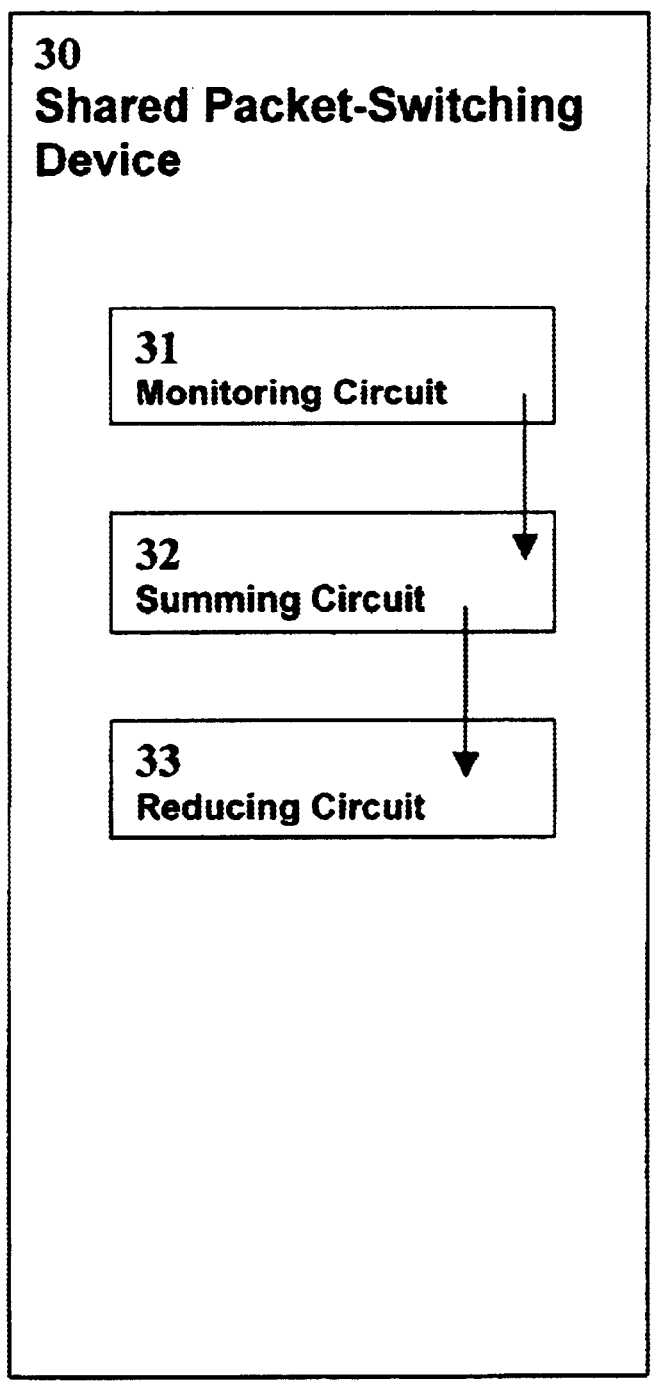
FIG. 3 illustrates a schematic view of a computer apparatus for facilitating bandwidth sharing.

The present invention likewise relates to an embodiment as a computer apparatus (illustrated in FIG. 3) for facilitating bandwidth sharing, for use on respective interstitial connections between on one side a plurality of users and on the other side a common data-link having a shared packet switching device, the apparatus 30 including:

a first circuit 31 for monitoring data-link directed bandwidth from each user;

tied to the first circuit, a second circuit 32 for maintaining a current sum of the monitored bandwidth; and tied to the second circuit, a third circuit 33 for reducing current collective data-link directed bandwidth, whenever the current sum exceeds a predetermined data-link bandwidth threshold, by:

for substantially each user, comparing the respective user's data-link directed bandwidth with a predetermined data-link bandwidth threshold for the respective user;

using an allocation function, selecting at least one user who is exceeding his predetermined data-link bandwidth threshold, and for a predetermined time interval, cutting the connection between each selected at least one user and the shared switching device, so as to restore a current sum of the monitored bandwidth to be not greater than the predetermined data-link bandwidth threshold.

Furthermore, the present invention relates to a program storage device 40 (illustrated in FIG. 4) readable by machine, tangibly embodying a program of instructions executable by the machine to perform method steps for a bandwidth sharing method for use on respective interstitial connections between on one side a plurality of users and on the other side a common data-link having a shared packet switching device, said method including performing the steps of:

monitoring 41 data-link directed bandwidth from each user;

maintaining 42 a current sum of the monitored bandwidth; and whenever the current sum exceeds a predetermined data-link bandwidth threshold, reducing 43 current collective data-link directed bandwidth by:

for substantially each user, comparing 44 the respective user's data-link directed bandwidth with a predetermined data-link bandwidth threshold for the respective user;

using an allocation function, selecting 45 at least one user who is exceeding his predetermined data-link bandwidth threshold, and for a predetermined time interval, cutting 46 the connection between each selected at least one user and the shared switching device, so as to restore a current sum of the monitored bandwidth to be not greater than the predetermined data-link bandwidth threshold.

DETAILED DESCRIPTION OF THE PREFERRED EMBODIMENT

Bandwidth Control Machine

Introduction

A step by step description for an algorithm for Bandwidth Control (BC) is presented. In the context of a plurality of users, the general purpose of the BC algorithm is for limiting Bandwidth (BW) usage, or conversely guaranteeing a minimum BW. More specifically, the purpose of the BC algorithm is to be able to guarantee a minimal bandwidth to customers who will purchase such an advantage, and to equally distribute the momentarily unused bandwidth to all users.

The allocation of available bandwidth in a basic BC-type machine is based on the following principles:

1. Guarantee immediate bandwidth to users who have purchased a committed rate.
2. Bandwidth allocated is measured in Bytes per unit-time, not in frames (Equivalently it can be equally expressed in Bits/Second).
3. Any unused bandwidth is fairly allocated to all users, on the principle of equal opportunity.

The described algorithm has the following properties:

1. It is equally implement-able in SOFTWARE as well as HARDWARE.
2. It provides points of control to a management entity in order to flexibly modify the BC parameters within a very large range.
3. The bandwidth control of a port is based on the possibility to stop, for some time, that port from transmitting data to the Aggregator.

List of Abbreviations

BC—Bandwidth Control
BW—Bandwidth
WMH—Water Mark High
WML—Water Mark Low

General Approach

The BC machine described here functions to some extent in a similar manner to an elementary Math problem: 24 pipes bring water into a pool at the rate of 10 gallons per second, while one pipe takes water out of the pool at a rate of 100 gallons per second. The pool can contain 140,000 gallons. How long will it take to fill the pool?

Clearly the pool will fill after some time and even overflow:

$$\frac{140{,}000 \ \text{Gl}}{\dfrac{10 \ \text{Gl}}{\text{Sec} \times 24} - \dfrac{100 \ \text{Gl}}{\text{Sec} \times 1}} = 16.67 \ \text{minutes}$$

In the case of the BC machine analogy, we add an additional parameter. When the water is above a sign named Water Mark High (WMH), the pipes bringing water into the pool are shut closed. Then for some time water will flow only out of the pool, the water level will drop below another sign named Water Mark Low (WML) and the pipes bringing water into the pool will reopen to allow water flow.

In the case of the BC-type machine, the pool is the switch buffer, the pipes are the ports attached to the users, and the pipe taking the information out is the up-link.

The complete implementation is based on additional requirements:

1. The BC machine is independent of the switch it is associated with.
2. The flow into the switch buffer is not constant. The average flow is determined by sampling the data flow at constant time intervals.
3. The flow out of the switch buffer is constant.
4. The parameters shall be sufficiently flexible to accommodate up-links from 1.55 MBit/Sec up to 155.52 MBit/Sec.
5. A similar machine shall be designed for the information flow from the up-link to the users. However that machine shall be required to limit the flow, since there is no buffer to overflow.

The proposed machine assumes that there is no information from the switch, regarding the buffer, or flow rate of the data. If the switch can provide indication of its buffer filling, then the machine will function the same; and we can drop the integrative function of the variable B defined below.

In order to understand the BC algorithm a step by step approach is taken.

STEP 1

Let's assume that we are interested in building a simpler BC algorithm, which allocates available BW to all users in a straightforward manner. The reader is warned that in this "STEP 1" there will be no BW allocation. The writer is committed to improve that in "STEP 3".

In this "STEP 1" all users are allowed to use 10 Mbit/Sec bandwidth. There is no bandwidth limitation (to less than 10 Mbit/Sec) or commitment of BW per port.

There are $Kp_{Ports}$ ports.

The system has a $B_{max}$ of total buffering capability.

For each port there are the following flags:

Frame-in-transit$_{Port}$ Asserted when information is in transit between MODEM port and Aggregator. De-asserted otherwise.

Tx-Flag$_{Port}$ Transit permitting flag. Asserted by the BC machine, when a port is allowed to transfer information. De-asserted otherwise. The x stands for "t" when the transfer is from Aggregator to Link Modules, and x stands for "r" when the transfer is from Link Modules to Aggregator.

Step 1 is illustrated in FIG. 5. In this figure, the index "Port" indicates the port number. There are $K_{Ports}$ such indexes.

Using FIG. 5, let's see how this over simplified process serves its purpose. Assume that:

$K_{Ports}$=23, (a common example case)

Then we will assume that no port sends any data to the Aggregator. B will contain the value 0, and Tx-Flag$_{Port}$ for all ports will be asserted and stay like that.

From time to time a port will send data. Every time data is sent from a port the flag Frame-in-transit$_{Port}$=TRUE, and B is increased. As long as B<WMH (Water Mark High) Tx-Flag$_{Port}$ for all ports will be asserted and stay like that.

If many ports send information at the same time, the filling rate of the buffer is larger than the emptying rate, after some time B will contain a value that exceeds WMH. Therefore Tx-Flag$_{Port}$ for all ports will be de-asserted. After some time the value contained in B will be less than WML (Water Mark Low), and Tx-Flag$_{Port}$ for all ports will be asserted again, allowing transfer of information.

NOTE: The operation performed by the first loop is:

$$B = B + \text{the number of transmitting ports} - 10$$

The implementation is for HARDWARE convenience.

There are many missing features in this simplified process:

There is no mechanism for committing BW to preferred users.

There is no mechanism to limit traffic to ports allocated to users who want to pay for low BW only.

The process works with up-links having BW=i×10 Mbit/Sec (i any integer>0)

This arrangement is not good. We need to allow the service provider to deliver almost any business model, based on a variety of Up-Link technologies. Attachemnt to a wide variety of Up-Links will be shown in step 2.

STEP 2

In this step, illustrated in FIG. 6, the above algorithm will be suitable to Up-Links from as low as 1.55 MBit/Sec and as fast as 155.52 MBit/Sec. As illustrated in FIG. 6, three more variables are added:

$b_{in}$: Specifies the amount of data being transferred into the Switch buffer by each port. It is assumed that all ports have equal maximal data rate.

$b_{out}$: Specifies the amount of data being transferred out of the Switch buffer by the up-link $n_{out}$: In conjunction with $b_{out}$ calculates the amount of buffer released by the data flow out over the Up-Link.

Like before, in this example, if $K_{Ports}$ the number of ports in the system, is chosen as a common example.

$K_{Ports}$=23.

Then the loop will cycle 24 times every sampling instance.

Explanation of the operation done in the example at left.

The first loop decreases the value in B by: $n_{out} \times b_{out}$, but not below 0.

The second loop increases the value in B by:

$$\text{the number of transmitting ports} \times b_{in}$$

The choice to implement the calculation above in two loops is believed to deliver the most efficient HARDWARE solution. Any other implementation delivering the same calculation can be equally useful.

Note that we still provide all available BW to all users, without any preferences, and without imposing any limitation. Since we need to provide different usage profiles to users, we need to add more variables, and more points of interaction. That will be done in step 3.

STEP 3

In this step, illustrated in FIG. 7, we will add the capability to commit to an attachment a whole 10 Mbit/Sec chunk of BW. And for the sake of this step, we need one tabular function.

PPL(Port)

It is the responsibility of the management system to fill in and maintain the values.

The returned value according to Port value is:

0 if there is a commitment to deliver 10 Mbit/Sec BW as soon as it is required.

128 if there is no commitment to deliver BW, unless there is some available.

The decision to use the value 128 as the sign for NO COMMITMENT will be more understandable in the context of the next step.

What have we achieved?

The "If PPL(Port)=128 {Tx-Flag$_{Ports}$=0}" portion of the code de-asserts the Tx-Flag of those ports for which there is no commitment to deliver BW. The ports for which there is a commitment to deliver BW are kept, and they can further transfer information. The next operation (conditional on B<WML) is written to set all Tx-Flag$_{Ports}$ independent of the value of PPL(Port). That has been done for two reasons:

Ease of reading and understanding

It is useful to visit from time to time a HARDWARE flag and make sure it did not change its value due to a noisy signal.

As illustrated in FIG. 7, in STEP 3 above we differentiated between ports with committed 10 Mbit/Sec and the others which will use the remainder of the bandwidth. The former got their share unconditionally, the latter, received the right to send only if some bandwidth is still available. Now we need to add the last bit of flexibility; the capability to commit a fraction of the possible 10 Mbit/Sec. Therefore we move to step 4a.

STEP 4A

In this step we will add the following variables:

$\delta_{Port}$ A per port variable, returned by PPL(Port). It is a measure for the used bandwidth.

$N_{Port}$ A per port variable, counts the used bandwidth by the port Port.

How is the function of PPL(Port) organized? The table below shows the organization of the table.

| BW4 6PORT | Committed Bandwidth $\delta_{Port}$ |
|---|---|
| 0 | |
| 1 | |
| 2 | |
| 3 | |
| 4 | |
| . | |
| . | |
| . | |
| $K_{Ports}$ | |

The returned value is chosen according to the value of the variable Port:

The number in Committed Bandwidth column is the denominator of the fraction of the committed bandwidth minus one. For example:

If we commit full bandwidth the number will be 0.
If we commit ½ bandwidth the number will be 1.
If we commit ⅓ bandwidth the number will be 2.

Like in STEP 3 above, there is one special value: 128. If a value of 128 is entered in the Committed Bandwidth column, it indicates that there is NO COMMITTED bandwidth for the port. The choice of 128 is partially arbitrary, however, for HARDWARE implementation a whole power of 2 allows usage of the most significant bit as the NO COMMITTED bandwidth flag. For smaller implementations, we may adopt 64 or even 32 as the NO COMMITTED bandwidth flag.

As shown in FIG. 8, there are several changes relative to the previous step:

One. The addition of the pair $\delta_{Port}$, $N_{Port}$. Notice that $N_{Port}$ is incremented in steps of $\delta_{Port}$ and decremented in steps of 1. Therefore every time a port transmits, and as long as that port transmits, $N_{Port}$ grows. As long as $N_{Port}$ is not 0, the BC machine will not assert Tx-Flag$_{Port}$ except if there is unused bandwidth.

Two. Since $N_{Port}$ is incremented as long as there still is a frame in transit, the used bandwidth is in quantum of bytes. The longer the frame, the larger will be the value in $N_{Port}$ and the longer it will take until the BC machine will assert the Tx-Flag$_{Port}$ again, except if there is available bandwidth. Therefore the commitment of the BC machine is to true bandwidth.

Three. The unused bandwidth is shared equally among all ports, independent of any committed bandwidth.

Four The PPL(Port) function is controlled by the management system. The values in the table are written and modified by the management.

Five. Even if there is no unused bandwidth, once a port must be granted its committed share of bandwidth, is allocated.

Additional analysis is required on:
1. Response time
2. Overheads
3. Buffers balance Such analysis will follow.

NOTES:
1. The above arrangement allows allocation of committed bandwidth in fractions beginning at ½ and decreasing. There is no ¾ of bandwidth allocation. Such capability is possible if we modify the PPL(Port) function to a two column. The first one should return the $\delta_{Port}$ as above, and the second column should return a new variable, $\gamma_{Port}$ which is the amount the variable $N_{Port}$ is decrease by. The ratio between the $\delta_{Port}$ and $\gamma_{Port}$ will allow allocation of bandwidth shares larger than ½. Such arrangement was not required, and will unnecessarily, increase the complexity of the machine implementing $N_{Port}$ variable.
2. The above arrangement puts no limit on the allocation of available BW. Some service providers may want more options for building their business model. The following are resonable options:
   2.1 Sell a rigid amount of not-committed BW, as the lowest value service (i.e. prevent usage of BW more than a certain limit, even if available).
   2.2 For a higher price the service shall be still not-committed, but available BW is distributed to those who paid for that up to the limitations of the user equipment (i.e. 10 MBit/Sec).
   2.3 Commitment of some minimum BW still limited to a maximum.
   2.4 Commit to a minimum amount of BW and allow usage of additional BW available up to the maximal capability of the user equipment (i.e. 10 MBit/Sec)

The next step (4B) describes the same algorithm as described here. FIG. 9 shows the algorithm with the modification the shaded area.

STEP 4B

As we see in FIG. 9, for the purpose of this added functionality we add the following flags:

Level0 When asserted, indicates that the port receives only a limited amount of BW, independent of the available amount.

Level1 When asserted, indicates that the port can receive any amount of available BW, but there is no commitment to allocate any amount.

Level2 When asserted, indicates that the port has some minimum committed BW.

Level3 When asserted, indicates that the port has some minimum committed BW, and can use any available BW.

In order to implement the limitation of the BW for Level0 the system must set an appropriate value in $\delta_{Port}$ by which the counter $N_{Port}$ shall be incremented. Notice that for Level0, even if the $N_{Port}=0$, the Tx-Flag is asserted only if B<WML, which means the BW is allocated when available, but since that does not happen before the expiration of $N_{Port}$, the user recieves always a limited BW.

Summary

A Bandwidth Control (BC) algorithm is presented, and explained in a step by step fashion. Each step shows the implementation of one major feature of the BC machine. By means of flow graph, it is shown that the algorithm is an infinite loop with no dead ends, therefore it will perform endlessly, unless stopped by an external intervention.

Implementation

The implementation analysis presented below is meant to provide a feasibility study, under the following assumptions:

The Bandwidth Control (BC) machine is implemented in a XILINX FPGA, from the Spartan family.

There are 10 values of $\delta_{Port}$ including 0 and no committed bandwidth.

The Frame-in-Transit flag is based on sensing local to traffic switching node.

Summary of Sections

1. Implementation of Frame-in-Transit Flag.
2. Implementation of the $N_{Port}$ Counters.
3. Additional Blocks to be Taken into Account.
4. Implementation of the Tx-Flag Assertion Mechanism.

1. Implementation of Frame-in-Transit flag.

Figure 10:
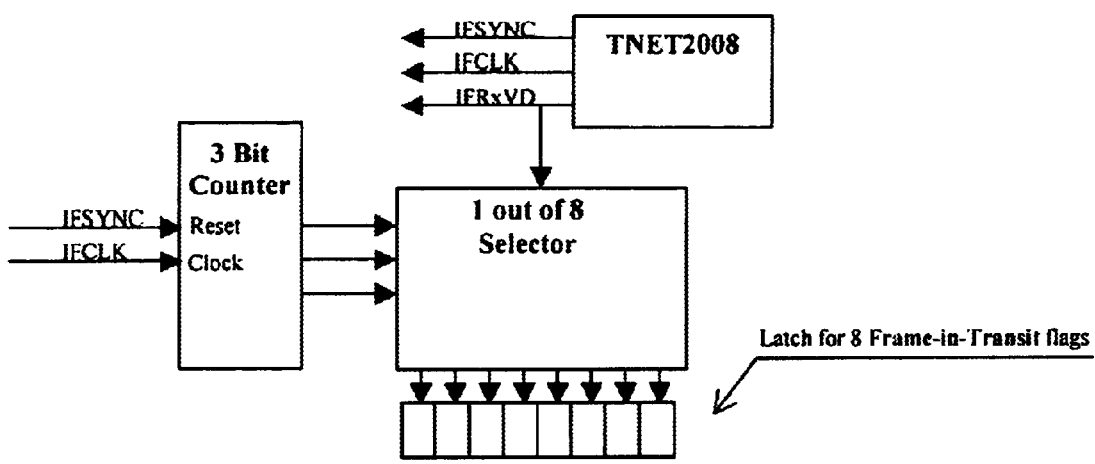
FIG. 10 illustrates the implementation of the Frame-in-Transit flag.

FIG. 10 illustrates the implementation of a Frame-in-Transit flag.

NOTES:

1.1 The clock counts by IFCLK signal, which is output from TNET2008. There will be 3 such clock signals. The internal BC Machine will operate on a clock signal that even if is derived from the same source like IFCLK-s there will be no commitment to its phase. Therefore some meta-stability should be taken into account when designing the interface to the rest of the machine.

1.2 The counting cycle starts with Port-2 of the TNET2008.

2. Implementation of the $N_{Port}$ counters.

The basic assumption is that each port must be visited once every 9.6 $\mu$Sec or less. The number is the minimal Inter Frame-Gap (IFG) allowed by 802.3 standard. The reason behind that requirement is that if a port attempts to transmit a number of frames back to back, the Tx-Flag$_{Port}$ must be asserted before that period of time expires, or a performance degradation will be observed.

Data rates, relative to full 10 MHz.

| $\delta_{Port}$ | Bandwidth [Bits/Sec] | Bandwidth for frames of 190 Bytes Long | Similar to |
|---|---|---|---|
| 0 | 1.00E + 07 | 8.29E + 06 | |
| 1 | 5.00E + 06 | 4.14E + 06 | |
| 2 | 3.33E + 06 | 2.76E + 06 | |
| 4 | 2.00E + 06 | 1.66E + 06 | |
| 8 | 1.11E + 06 | 9.21E + 05 | |
| 16 | 5.88E + 05 | 4.87E + 05 | |
| 32 | 3.03E + 05 | 2.51E + 05 | 256 kBit/Sec |
| 64 | 1.54E + 05 | 1.27E + 05 | 128 kBit/Sec |
| 128 | 7.75E + 04 | 6.42E + 04 | 64 kBit/Sec |

The above numbers vary and are dependent on the frame length. The number 190 Bytes per frame has been chosen since it generates an effective bit rate similar to Telco numbers. Shorter frames will further decrease the effective bit rate. (At the minimum allowed by 802.3 standard, 64 Bytes and $\delta_{Port}$=128, the effective bit rate will be: 44.6 kBits/Sec)

NOTE: $\delta_{Port}$ is the value returned by PPL(Port) as mentioned previously (Bandwidth Control Machine).

Figure 11:
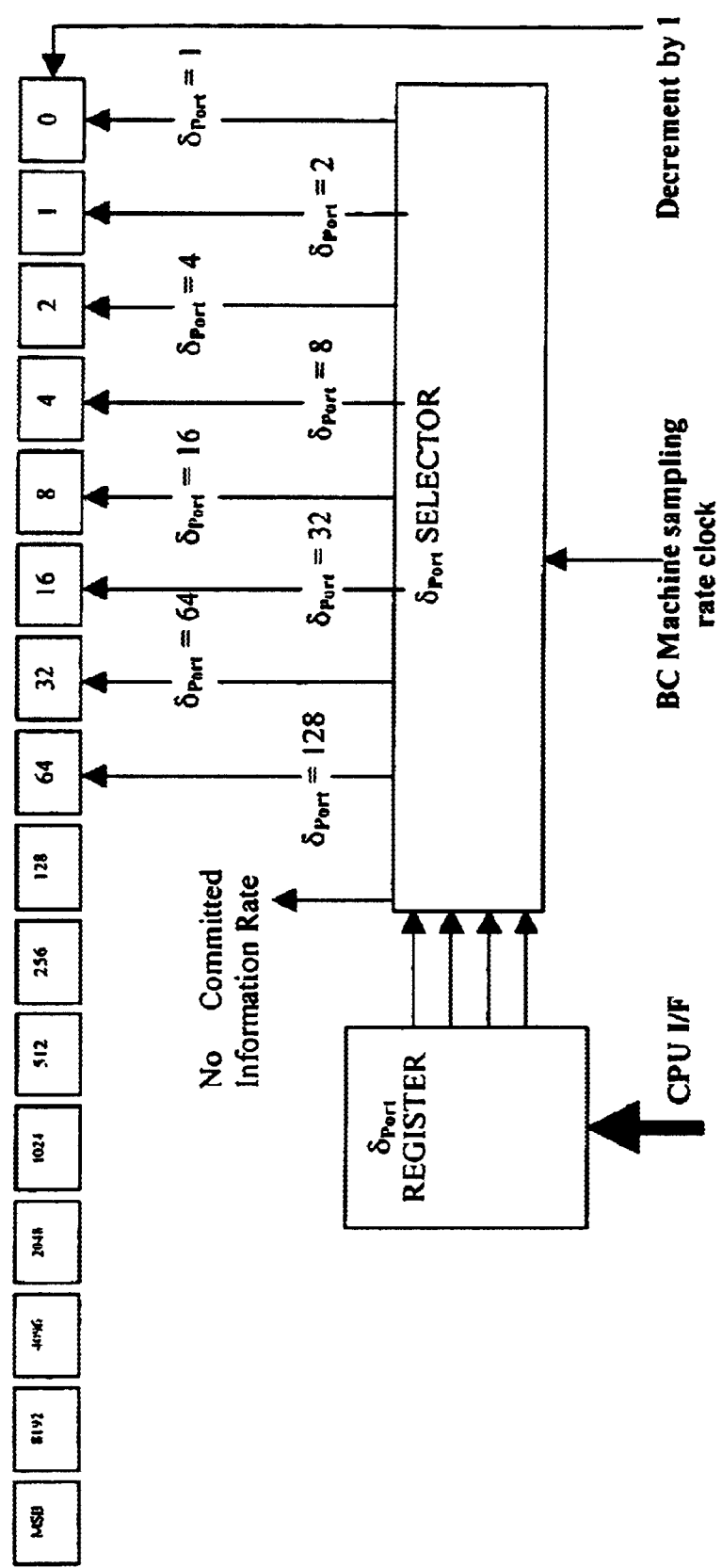
FIG. 11 illustrates a schematic view of $N_{Port}$ counter.

The numbers for $\delta_{Port}$ have been chosen in order to facilitate the implementation of the $N_{Port}$ counters. FIG. 11, a block diagram of $N_{Port}$ depicts the general scheme.

NOTES:

3.1 The $N_{Port}$ counters always end containing 0. Therefore counting in leaps of 1, 2, 4, etc., is inherent to their functionality.

3.2 The numbers for $\delta_{Port}$ are achievable by minimum H/W requirements.

3.3 No prevention of rolling over FFFF shown. It should not be assumed that it cannot happen.

3.4 The case of $N_{Port}$=128 which indicates NO bandwidth committment in the algorithm description, is implemented by the $\delta_{Port}$ selector.

3. Additional blocks to be taken into account.

One. Counter BW

Two. Counter $BW_C$

Three. Various glue logic

Flop-Flop count

| | Functional Block | Number of F Blocks | Estimated number of Flip-Flops per Functional Block | Spares | Flip-Flops TOTAL |
|---|---|---|---|---|---|
| 1 | Frame-in-Transit | 3 | 11 | 1 | 36 |
| 2 | ForM | 1 | 34 | 4 | 38 |
| 3 | $N_{Port}$ | 24 | 20 | 1 | 480 |
| 4 | BW, $BW_c$, etc. | 3 | 8 | 0 | 24 |
| 5 | Glue logic | 1 | 12 | 0 | 12 |
| GRAND TOTAL | | | | | 590 |

4. Implementation of the Tx-Flag Assertion Mechanism.

The effectivity of Tx-Flag is in the ETHERNET part of the modems. It is reasonable to implement it in the modem H/W. Since the BC Machine is located in the Aggregator, the Tx-Flag assertion mechanism must contain a communication process over the back plane of the example platform. Indeed, four (4) wires have been designed into the back plane from the Aggregators to the six slots 1 to 6, and four additional wires have been designed into the back plane from the Aggregators to the six slots 9 to 14. In the reminder of this paragraph, each of the mentioned four wires will be mentioned as BC Control Channel (BCC). Since there are two such BCC-s we will name them BCCL for the left side (slots 1 to 6) and BCCR for right (slots 9 to 14). The process described below is the communication protocol from the an Aggregator to any modem.

In the maximal configuration anticipated for the example platform there will be 48 modems. Considering the implementation of the BCC the maximal number of modems to be serviced by the BC Machine over one BCC is 24. Assuming that the sampling time is $\tau$ there is $\tau/24$ Sec for each Tx-Flag to be asserted. It is highly recommendable to allow for some spare capacity in any communication channel, and so shall be done for BCC too.

H/W Utilization

Figure 12:
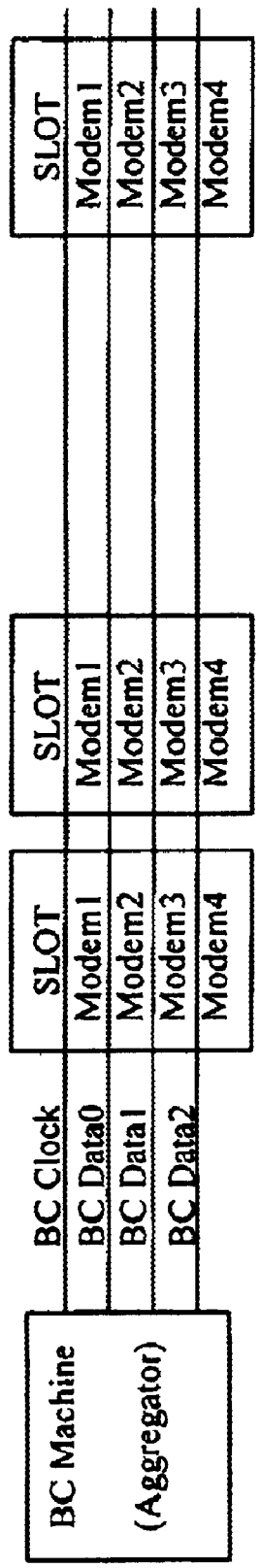
FIG. 12 illustrates the utilization of the four wires in each Bandwidth Control Channel (BCC).

The four wires in each BCC will be utilized as depicted in FIG. 12.

Notice in FIG. 12 the usage of one wire for accompanying CLOCK and three parallel bits of DATA. For each Tx-Flag 9 bits will be sent. Since there are 24 modems to be serviced the first 6 bits shall be used for addressing, in a format of 5 bits ADDRESS and 1 bit parity check. The other 3 bits DATA, shall be assigned values as specified below.

| DATA | Command for modem |
|---|---|
| 000 | No Operation |
| 001 | Set Tx-Flag |
| 010 | Future |
| 011 | Future use |
| 100 | Future use |
| 101 | Future use |
| 110 | Future use |
| 111 | Future use |

ADDRESSING Rules

The C³ addressing allocation is specified in the table below.

| | ADDRESS | Bits | Value | Indicated | Modem |
|---|---|---|---|---|---|
| 1  | 000 | 00 | 0 | 1 in slot 1 | 1 in slot 9  |
| 2  | 000 | 01 | 1 | 2 in slot 1 | 2 in slot 9  |
| 3  | 000 | 10 | 1 | 3 in slot 1 | 3 in slot 9  |
| 4  | 000 | 11 | 0 | 4 in slot 1 | 4 in slot 9  |
| 5  | 001 | 00 | 1 | 1 in slot 2 | 1 in slot 10 |
| 6  | 001 | 01 | 0 | 2 in slot 2 | 2 in slot 10 |
| 7  | 001 | 10 | 0 | 3 in slot 2 | 3 in slot 10 |
| 8  | 001 | 11 | 1 | 4 in slot 4 | 4 in slot 10 |
| 9  | 010 | 00 | 1 | 1 in slot 3 | 1 in slot 11 |
| 10 | 010 | 01 | 0 | 2 in slot 3 | 2 in slot 11 |
| 11 | 010 | 10 | 0 | 3 in slot 3 | 3 in slot 11 |
| 12 | 010 | 11 | 1 | 4 in slot 3 | 4 in slot 11 |
| 13 | 011 | 00 | 0 | 1 in slot 4 | 1 in slot 12 |
| 14 | 011 | 01 | 1 | 2 in slot 4 | 2 in slot 12 |
| 15 | 011 | 10 | 1 | 3 in slot 4 | 3 in slot 12 |
| 16 | 011 | 11 | 0 | 4 in slot 4 | 4 in slot 12 |
| 17 | 100 | 00 | 1 | 1 in slot 5 | 1 in slot 13 |
| 18 | 101 | 01 | 1 | 2 in slot 5 | 2 in slot 13 |
| 19 | 101 | 10 | 1 | 3 in slot 5 | 3 in slot 13 |
| 20 | 101 | 11 | 0 | 4 in slot 5 | 4 in slot 13 |
| 21 | 110 | 00 | 0 | 1 in slot 6 | 1 in slot 14 |
| 22 | 110 | 01 | 1 | 2 in slot 6 | 2 in slot 14 |
| 23 | 110 | 10 | 1 | 3 in slot 6 | 3 in slot 14 |
| 24 | 110 | 11 | 0 | 4 in slot 6 | 4 in slot 14 |
|    | 111 | 00 | 1 | | |
|    | 111 | 01 | 0 | | |
|    | 111 | 10 | 0 | | |
|    | 111 | 11 | 1 | | |

What is claimed is:

1. A bandwidth sharing method for use on respective interstitial connections between on one side a plurality of users and on the other side a common data-link having a shared packet switching device, the method including performing the steps of:

One) monitoring data-link directed bandwidth from each user;

Two) maintaining a current sum of the monitored bandwidth; and

Three) whenever the current sum exceeds a predetermined overall data-link bandwidth threshold, reducing current collective data-link directed bandwidth by a) for substantially each user, comparing the respective user's data-link directed bandwidth with a predetermined user data-link bandwidth threshold for the respective user;

b) using an allocation function, selecting at least one user who is exceeding his predetermined user data-link bandwidth threshold, and c) for a predetermined time interval, cutting the connection between each selected at least one user and the shared switching device, so as to restore a current sum of the monitored bandwidth to be not greater than the predetermined overall data-link bandwidth thresholds, wherein performing at least one of the steps is done above a predetermined frequency.

2. The method according to claim 1 wherein the sub-steps of comparing and selecting are performed substantially with the same frequency as the monitoring step, so that the prerequisites to the sub-step cutting are always available in a updated form.

3. The method according to claim 1 wherein the sub-steps of comparing and selecting are performed substantially with the same frequency as the monitoring step, so that the prerequisites to the sub-step cutting are always available in a real-time form.

4. The method according to claim 1 wherein the allocation function used in the selecting sub-step includes randomizing selection from among the plurality of users currently exceeding their respective predetermined data-link bandwidth threshold.

5. The method according to claim 1 wherein the allocation function used in the selecting sub-step includes a proportional weighting to each respective user's recent exceeding of his respective predetermined data-link bandwidth threshold.

6. The method according to claim 1 wherein monitoring of data-link directed bandwidth includes measuring the respective bandwidth in units of actual bandwidth use which are substantially the same units as are used to determine if the predetermined data-link bandwidth threshold is exceeded.

7. The method according to claim 1 wherein monitoring of data-link directed bandwidth includes measuring the respective bandwidth in predetermined time interval units of bits, bytes or multiples thereof.

8. The method according to claim 1 wherein monitoring of data-link directed bandwidth includes measuring the respective bandwidth in units of average or typical data-link directed packets.

9. The method according to claim 1 wherein selecting includes ignoring at least one user who has just begun sending a large data-link directed packet.

10. The method according to claim 1 wherein reducing includes updating the predetermined data-link bandwidth threshold with a new data-link bandwidth threshold.

11. The method according to claim 1 wherein cutting the connection includes checking that the connection is presently not being used for sending a data-link directed data transmission.

12. An article of manufacture including a computer usable medium having computer readable program code embodied therein for bandwidth sharing, for use on respective interstitial connections between on one side a plurality of users and on the other side a common data-link having a shared packet switching device, the computer readable program code in said article of manufacture including:

One) first computer readable program code means for causing a computer to monitor data-link directed bandwidth from each user;

Two) tied to the first computer readable program code means, second computer readable program code means for causing the computer to maintain a current sum of the monitored bandwidth; and Three) tied to the second computer readable program code means, third computer readable program code means for causing the computer to, whenever the current sum exceeds a predetermined overall data-link bandwidth threshold, reduce current collective data-link directed bandwidth by a) for substantially each user, comparing the respective user's data-link directed bandwidth with a predetermined user data-link bandwidth threshold for the respective user;

b) using an allocation function, selecting at least one user who is exceeding his predetermined user data-link bandwidth threshold, and c) for a predetermined time interval, cutting the connection between each selected at least one user and the shared switching device, so as to restore a current sum of the monitored bandwidth to be not greater than the predetermined overall data-link bandwidth thresholds, wherein at least one of the computer readable code means performs its function above a predetermined frequency.

13. A computer apparatus for facilitating bandwidth sharing, for use on respective interstitial connections between on one side a plurality of users and on the other side a common data-link having a shared packet switching device, the apparatus including:

One) a first circuit means for monitoring data-link directed bandwidth from each user;

Two) tied to the first circuit means, a second circuit means for maintaining a current sum of the monitored bandwidth; and Three) tied to the second circuit means, a third circuit means for reducing current collective data-link directed bandwidth, whenever the current sum exceeds a predetermined overall data-link bandwidth threshold, by a) for substantially each user, comparing the respective user's data-link directed bandwidth with a predetermined user data-link bandwidth threshold for the respective user;

b) using an allocation function, selecting at least one user who is exceeding his predetermined user data-link bandwidth threshold, and c) for a predetermined time interval, cutting the connection between each selected at least one user and the shared switching device, so as to restore a current sum of the monitored bandwidth to be not greater than the predetermined overall data-link bandwidth threshold, wherein at least one of the circuit means performs its function above a predetermined frequency.

14. A program storage device readable by machine, tangibly embodying a program of instructions executable by the machine to perform the method of claim 1.

* * * * *